United States Patent
Lappeteläinen et al.

(10) Patent No.: US 6,693,915 B1
(45) Date of Patent: Feb. 17, 2004

(54) EFFICIENT BANDWIDTH ALLOCATION FOR HIGH SPEED WIRELESS DATA TRANSMISSION SYSTEM

(75) Inventors: Antti Lappeteläinen, Espoo (FI); Ari Väisänen, Ruutana (FI); Visa Tapio Smolander, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/546,703

(22) Filed: Apr. 10, 2000

(30) Foreign Application Priority Data

Apr. 13, 1999 (FI) .................................. 990811

(51) Int. Cl.[7] .................................. H04J 3/16
(52) U.S. Cl. ...................................... 370/468
(58) Field of Search ................. 370/278, 280, 370/282, 294, 314, 321, 326, 329, 330, 331, 332, 336, 337, 338, 345, 347, 348, 437, 442, 443, 444, 447, 458, 468, 477

(56) References Cited

U.S. PATENT DOCUMENTS

| | | | | |
|---|---|---|---|---|
| 5,355,368 A | * | 10/1994 | Dore et al. | 370/296 |
| 5,384,777 A | * | 1/1995 | Ahmadi et al. | 370/337 |
| 5,594,720 A | * | 1/1997 | Papadopoulos et al. | 370/330 |
| 5,644,576 A | * | 7/1997 | Bauchot et al. | 370/437 |
| 5,870,385 A | * | 2/1999 | Ahmadi et al. | 370/252 |
| 5,970,062 A | * | 10/1999 | Bauchot | 370/310.2 |
| 6,275,506 B1 | * | 8/2001 | Fazel et al. | 370/478 |
| 6,310,866 B1 | * | 10/2001 | Kronestedt et al. | 370/330 |

FOREIGN PATENT DOCUMENTS

| | | |
|---|---|---|
| EP | 0738061 A2 | 10/1996 |
| EP | 0804006 A3 | 10/1997 |
| GB | 2 292 655 A | 2/1996 |
| GB | 2306083 A | 4/1997 |
| WO | WO 96/31036 | 10/1996 |
| WO | WO 98/49791 | 11/1998 |
| WO | WO 99/08421 | 2/1999 |

OTHER PUBLICATIONS

Farnham, T. et al "Dynamic Reconfiguration & Efficient Resource Allocation for Indoor Broadband Wireless Networks" Universa Personal Communications, 1998. IEEE 1998 International Conference on 05–09 Oct. 1998, vol. 1, pp. 53–57.*

* cited by examiner

Primary Examiner—Chi Pham
Assistant Examiner—Anh-Vu H Ly
(74) Attorney, Agent, or Firm—Perman & Green, LLP

(57) ABSTRACT

The invention relates to a method in a wireless data transmission system (1) which comprises wireless terminals (MT1–MT4), at least a first access point (AP1) and a first access point controller (AC1), a second access point (AP2) and a second access point controller (AC2). In the data transmission, data frames are used. In the invention, two allocation strategies are defined of which two are selected at a time. From the data frames, a first starting point (TS11, TS21) and a second starting point (TS1n, TS2n) are determined. In order to select a strategy, it is examined whether there is other traffic on the channel. If other traffic can be detected, it is examined which allocation strategy is selected, and an allocation strategy which is different from that of the examined connection is selected for the connection to be set up. However, if traffic is not detected, it is possible to select the allocation strategy freely. In the first allocation strategy, the allocation of the time slots of the data field (D1, D2) is started from the first starting point (TS11, TS21) of the data field, and in the second allocation strategy, the allocation of the time slots of the data field is started from the second starting point (TS1n, TS2n) of the data field.

16 Claims, 8 Drawing Sheets

EFFICIENT BANDWIDTH ALLOCATION FOR HIGH SPEED WIRELESS DATA TRANSMISSION SYSTEM

BACKGROUND OF THE INVENTION

1. Field of the Invention

The present invention relates to a method in a data transmission system according to the preamble of the appended claim 1. Furthermore, the invention relates to a wireless data transmission system according to the preamble of the appended claim 11.

2. Brief Description of Related Developments

The considerable increase in the use of information services especially as a result of the increase in Internet services and so-called World Wide Web (WWW) services has generated a need to develop faster data transmission services to transmit information between the information service provider and the terminal using the information service. Furthermore, most information services contain so-called multimedia information, such as images, video image and sound. The transmission of such multimedia information requires a high data transmission rate to implement the highest possible real-time degree in the data transmission.

Data transmission systems intended for office use, i.e. so-called local area networks (LAN) are primarily implemented as landline systems. Thus, the communication between the terminals and the server is implemented either electrically via a cable or optically via an optical fibre. The advantage of such a fixed system is that it is possible to achieve relatively high data transmission rates. The disadvantage of such a fixed data transmission network is that it is difficult to make changes and the terminals have to be placed relatively close to the coupling points intented for them, wherein the mobility of the terminal is affected. The implementation of such a fixed local area network in an existing building is not always successful, or it is expensive to install the cables afterwards. On the other hand, especially in older buildings, the existing data transmission cables are not necessarily suitable for fast data transmission.

There are several wireless data transmission systems under development to implement local area networks. Numerous landline data transmission systems are based on the use of radio signals in the data transmission. One such data transmission system for a local area network that is being developed and is based on radio data transmission is a so-called HIPERLAN (HIgh PErformance Radio Local Area Network). The term broadband radio access network (BRAN) is also used for such a radio network.

In the version 2 of the HIPERLAN data transmission system that is under development, the aim is to reach a data transmission rate in the order of 25 Mbit/s when the maximum connection distance is some tens of metres. Such a system is suitable to be used within the same building for example as an internal local area network for a single office. There is also a so-called HIPERACCESS data transmission system under development, the aim of which is to reach the same data transmission rate as in said HIPERLAN/2 data transmission system, but a connection distance of a few hundreds of meters, wherein the HIPERACCESS system is suitable to be used as a regional local area network for example in schools and larger building complexes.

The appended FIG. 1b shows in a reduced manner the frame structure applied in the data link layer DLC of the HIPERLAN/2 system used as an example. The data frame FR is composed of control fields C, such as RACH (Random Access Channel), BCCH (Broadcast Control CHannel) and FCCH (Frequency Correction CHannel), and a data field D which comprises a fixed amount of time slots TS1, TS2, ..., TSn, in which the actual useful information can be transmitted.

In the HIPERLAN/2 system, data transmission is based on time division multiple access TDMA, wherein there may be several simultaneous connections on the same channel, but each connection is allocated a time slot of its own in said frame, in which time slot information is transmitted. Because the data transmission quantity is not constant in every simultaneous connection, but varies temporally, a so-called adapting TDMA method is used in which the number of time slots allocated for each connection can vary from zero to maximum depending on the loading situation at the time and on the data transmission capacity allocated for the connection.

For the time division multiple access to work, the terminals coupled to the same node have to be synchronized with each other and with the transmission from the node. This can be achieved for example in such a way that the receiver of the wireless terminal receives signals on a channel. If a signal is not detected on the channel, the receiver changes over to receive on another channel, until all the channels have been examined or a channel is found on which a signal transmitted by an access point is detected. By receiving and demodulating this signal, it is possible to determine the moment of transmission of the control channel BCCH of the access point in question and to synchronize the terminal on the basis thereof. In some cases, the terminal can detect the signal of more than one access point, wherein the terminal advantageously selects the access point which has the strongest signal in the receiver, and performs the synchronization with this access point.

When the terminal is synchronized with the access point, the terminal can initiate a connection set-up to couple to this access point. This can be conducted advantageously in such a way that the terminal transmits on the RACH control channel a connection set-up request to the access point. In practice, this means that the terminal transmits in the time slot allocated to the RACH control channel and at the same time the access point listens to the communication on the channel i.e. receives signals on the channel frequency it is using. When the access point detects that a terminal is transmitting a connection set-up request message, it performs the procedures necessary for the connection set-up, such as resource allocation for the connection, if it is possible. In the resource allocation, the quality of service requested for the connection is taken into account, which affects e.g. the number of time slots to be allocated for the connection. The access point informs the terminal whether the connection set-up is possible or not. If the connection set-up is successful, the access point transmits in the BCCH control field e.g. data on the transmission time slots, reception time slots, connection identifier, etc. which are allocated for the connection. The number of transmission and reception time slots is not necessarily the same, because in several cases the quantity of information to be transmitted is not the same in both directions. For example when using an Internet browser, the quantity of information transmitted from the terminal is considerably smaller than the amount of information received in the terminal. Thus, with respect to the terminal, the required number of transmission time slots is smaller than that of reception time slots.

Furthermore, the number of time slots allocated for the connection can advantageously vary in different frames according to the need to transmit data. The access point controller is provided with a so-called scheduler, one function of which is the aforementioned allocation of time slots for different connections. The scheduler is implemented advantageously as an application program in the access point controller.

Since duplex data transmission is necessary in local area networks, duplex data transmission is also necessary on the radio channel. In a time division system this can be implemented either in such a way that some of the time slots of the frame are allocated for transmission from the wireless terminal to the access point (uplink) and some of them are allocated for the transmission from the access point to the wireless terminal (downlink), or in such a way that a separate frequency band is allocated for each data transmission direction. The HIPERLAN/2 system suggests the use of the former of the aforementioned methods, wherein the access point and the wireless terminals coupled to it do not transmit simultaneously.

In the HIPERLAN/2 systems, the access points can select the channel to be used in the connection irrespective of the other access points. Furthermore, the scheduler of the access point selects the moment of time to be used for the transmission irrespective of the other access points. In practice, this means that two or more access points can make an attempt to transmit simultaneously on the same channel, wherein the transmission is unsuccessful. In order to prevent this collision of transmissions, the transmitting access point or wireless terminal first listens to the communication of that channel on which the transmission is conducted. If no communication is detected on the channel within a given period of time, it is presumed that the channel is free and the transmission can be started. However, if communication is detected on the channel, the receiver is synchronized with this transmission. When the transmission is terminated, a possible new message is waited for and after that it is possible to retry to access the channel. However, several access points and/or wireless terminals may be waiting for their transmission turn, wherein situations may occur where several devices make an attempt of transmitting simultaneously. Furthermore, situations may arise in which all the devices on a particular channel are waiting for a transmission turn, i.e. the channel is underutilized. On the other hand, information is not transmitted in every time slot in every frame, wherein during such an empty time slot the channel is underutilized, because any other device waiting for transmission cannot transmit either during such a time slot in the present system.

As was presented earlier in this description, the radio local area network can comprise several access points, the scope of whose service area is influenced by the transmission capacity, ambient conditions, possible obstructions in the path of the signal, the directional pattern of the antenna, etc. In practice, the boundaries of the service area of the access points cannot be clearly defined, but the service areas of the access points located in the vicinity of each other overlap one another at least partly. Thus, in some cases, the wireless terminal can be located within the service area of two or more access points, but these access points do not necessarily detect the transmissions of each other and cannot synchronize with each other. The wireless terminal selects one of these access points to be used in the data transmission connection. On the other hand, the access point used in the connection at a given time can be changed when the wireless terminal is moved or when the quality of the connection varies, which is known as such. Because the access points can select the channel to be used in the connection irrespective of the other access points, and schedule the transmissions independently, it is possible that the properties of the data transmission between a wireless terminal and an access point used in the connection at a given time are influenced by one or more access points within whose service area the wireless terminal is located. Such interference can also occur in situations in which the frequencies to be used are not the same, but two access points transmit for example on adjacent channels.

The access points that interfere with the data transmission can also be access points of another radio network. This is possible especially in cases when in the same office building there are several radio network systems utilizing frequency ranges which overlap each other at least partly.

One criterion for setting up a connection between a wireless terminal and an access point is the quality of service (QoS) desired for the connection. In some connections, for example in data connections, the rate of the data transmission is not as significant a criterion as the reliability of the data transmission. Thus, the data transmission parameters are selected in such a way that as reliable a data transmission as possible is achieved. On the other hand, for example when transmitting an audio and video signal, it is the real-time quality of the data transmission that is important, not the accuracy. For such a connection requiring real-time data transmission, it is possible to allocate several time slots in a frame, wherein a higher data transmission rate can be achieved. If necessary, it is also possible to allocate several channels for one data transmission connection.

When the data transmission is being set up, the wireless terminal is listening in order to find out which access points have signals to be received. The wireless terminal advantageously measures the strength of the signals and selects the access point whose signal is the strongest at the moment. Thereafter the wireless terminal and the access point conduct connection set-up signalling for instance to transmit parameters such as the required data transmission rate, connection type, data transmission channel, time slots and connection identifier which are used in the connection.

Typically also during the connection, the wireless terminal measures the strength of the signal of the access point used in the connection as well as the strength of the signals of the other possible access points within the coverage area. If it is detected that the signal strength of another access point is sufficiently greater than the signal strength of the access point used at that particular moment, it is possible to conduct a handover to this access point, which is known as such.

SUMMARY OF THE INVENTION

The purpose of the present invention is to attain more effective utilization of the radio resources than in radio network systems of prior art. Another purpose of the invention is to produce a more disturbance-free data transmission system when compared with data transmission systems of prior art. The method according to the present invention is characterized in what will be presented in the characterizing part of the appended claim 1. The wireless data transmission system according to the present invention will be characterized in what will be presented in the characterizing part of the appended claim 11.

The invention is based on the idea that two allocation strategies are determined, one of which is selected at a given time. To select the strategy, it is examined whether there is other traffic on the channel. If other traffic is to be detected, it is examined which allocation strategy is selected, and an allocation strategy different from that of the connection being examined is selected for the connection to be set up. However, if traffic is not detected, it is possible to select the allocation strategy freely. In the first allocation strategy, the allocation of the time slots in the data field is initiated from the first starting point of the data field, and in the second allocation strategy the allocation of the time slots in the data field is initiated from the second starting point of the data field.

With the present invention, considerable advantages are achieved when compared with methods and wireless data transmission systems of prior art. By means of the method according to the invention, it is possible to increase the utilization ratio of each data transmission channel. Furthermore, in the data transmission system according to the invention, the effect of interference is reduced to a level which is lower than that in wireless data transmission systems of prior art. In the data transmission system according to the invention, the synchronization of the access points can be attained in a relatively simple manner without complex algorithms.

The implementation of practical applications is also facilitated when the two allocation strategies according to the invention are used in such a way that in the first allocation strategy the allocation of the time slots in the data field is initiated from the beginning of the data field, and in the second allocation strategy the allocation of the time slots is initiated from the end of the data field, and that the allocation strategy information is transmitted in a data frame.

BRIEF DESCRIPTION OF THE DRAWINGS

In the following, the invention will be described in more detail with reference to the appended drawings, in which.

DETAILED DESCRIPTION OF THE EMBODIMENT(S)

Figure 1A:
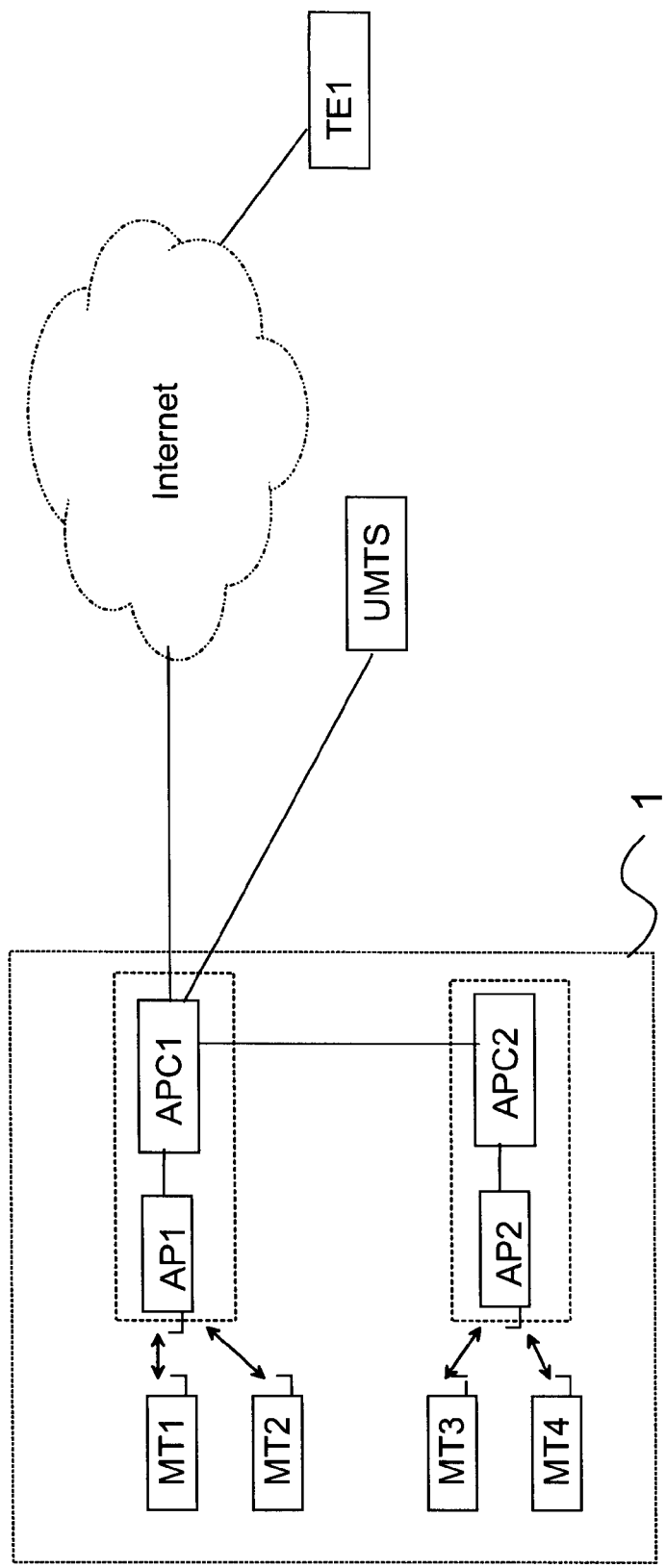
FIG. 1a is a reduced block diagram showing a data transmission system according to a preferred embodiment of the invention.

In the following description of the data transmission system 1 according to a preferred embodiment of the invention, a HIPERLAN/2 system according to FIG. 1a will be used as an example, but it is obvious that the invention is not restricted solely to this system. The data transmission system 1 is composed of wireless terminals MT1–MT4, one or more access points AP1, AP2, and an access point controller AC1, AC2. Between the access point AP1, AP2 and the wireless terminal MT1–MT4, a radio connection is set up to transmit for example signals necessary for the connection as well as information, such as data packets of an Internet application, during the connection. The access point controller AC1, AC2 controls the function of the access point AP1, AP2 and the connections established therethrough to the wireless terminals MT1–MT4. In such a radio network there may be several access point controllers AC1, AC2 communicating with each other and with other data networks, such as the Internet data network, the UMTS mobile communication network, etc., wherein the wireless terminal MT1–MT4 may communicate for example with a terminal TE1 connected to the Internet data network.

Figure 2:
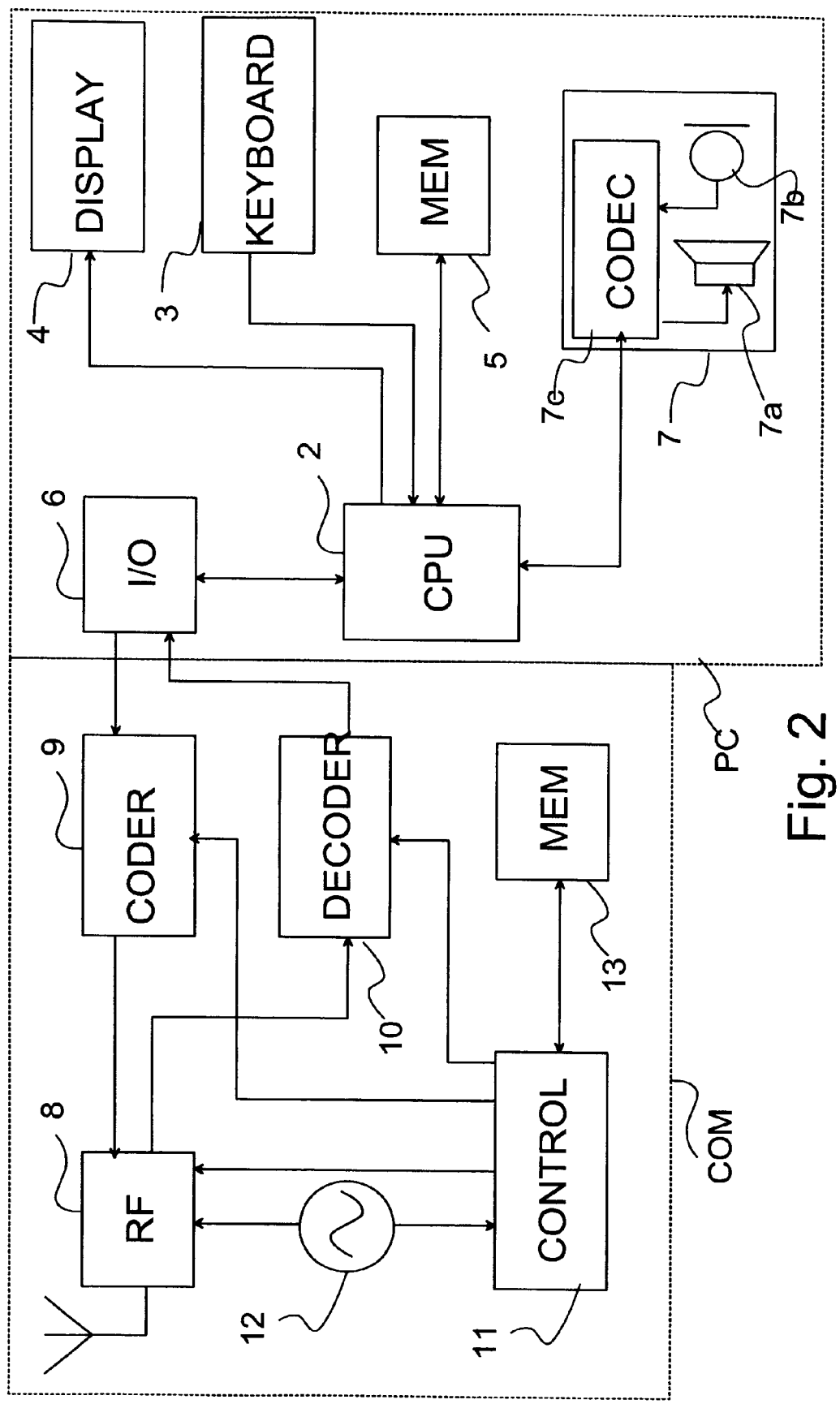
FIG. 2 is a reduced block diagram showing a wireless terminal according to a preferred embodiment of the invention.

FIG. 2 shows in a reduced block diagram a wireless terminal MT1 according to a preferred embodiment of the invention. The wireless terminal MT1 advantageously comprises data processing functions PC and communication means COM for setting up a data transmission connection to the wireless local area network. The wireless terminal can also be constructed in such a way that e.g. an auxiliary card is attached in a data processor, such as a portable computer, the auxiliary card comprising said communication means COM. The data processing functions PC advantageously comprise a processor, such as a microprocessor, a microcontroller or the like, a keyboard 3, a display device 4, memory means 5, and interface means 6. Furthermore, the data processing functions PC may comprise audio means 7, such as a speaker 7a, a microphone 7b and a codec 7c, wherein the user can utilize the wireless terminal MT1 also for transmitting e.g. speech. The information intended to be transmitted from the wireless terminal MT1 to the local area network is advantageously transmitted via the interface means 6 to the communication means COM. Correspondingly, the information received from the local area network 1 into the wireless terminal MT1 is transmitted to the data processing functions PC via said interface means 6.

The communication means COM comprise for instance a radio part 8, an encoder 9, a decoder 10, a control means 11, and a reference oscillator 12. Furthermore, the communication means COM comprise a memory 13 e.g. for establishing the transmitting and receiving data buffers necessary in the data transmission. The reference oscillator 12 is used to set up the necessary timings in order to synchronize the transmission and reception with the transmission or reception of the access point, as will be presented later in this description. The reference oscillator 12 can also be used to generate the timing signals of the control means 11. It is obvious that the frequency generated by the reference oscillator 12 cannot be used as such for setting up the channel frequency and generating the timing signals of the control means 11, wherein in practical applications means (not shown) for converting the frequency are used to convert the frequency of the reference oscillator 12 into a frequency suitable for controlling the function of the control means 11.

Figure 3:
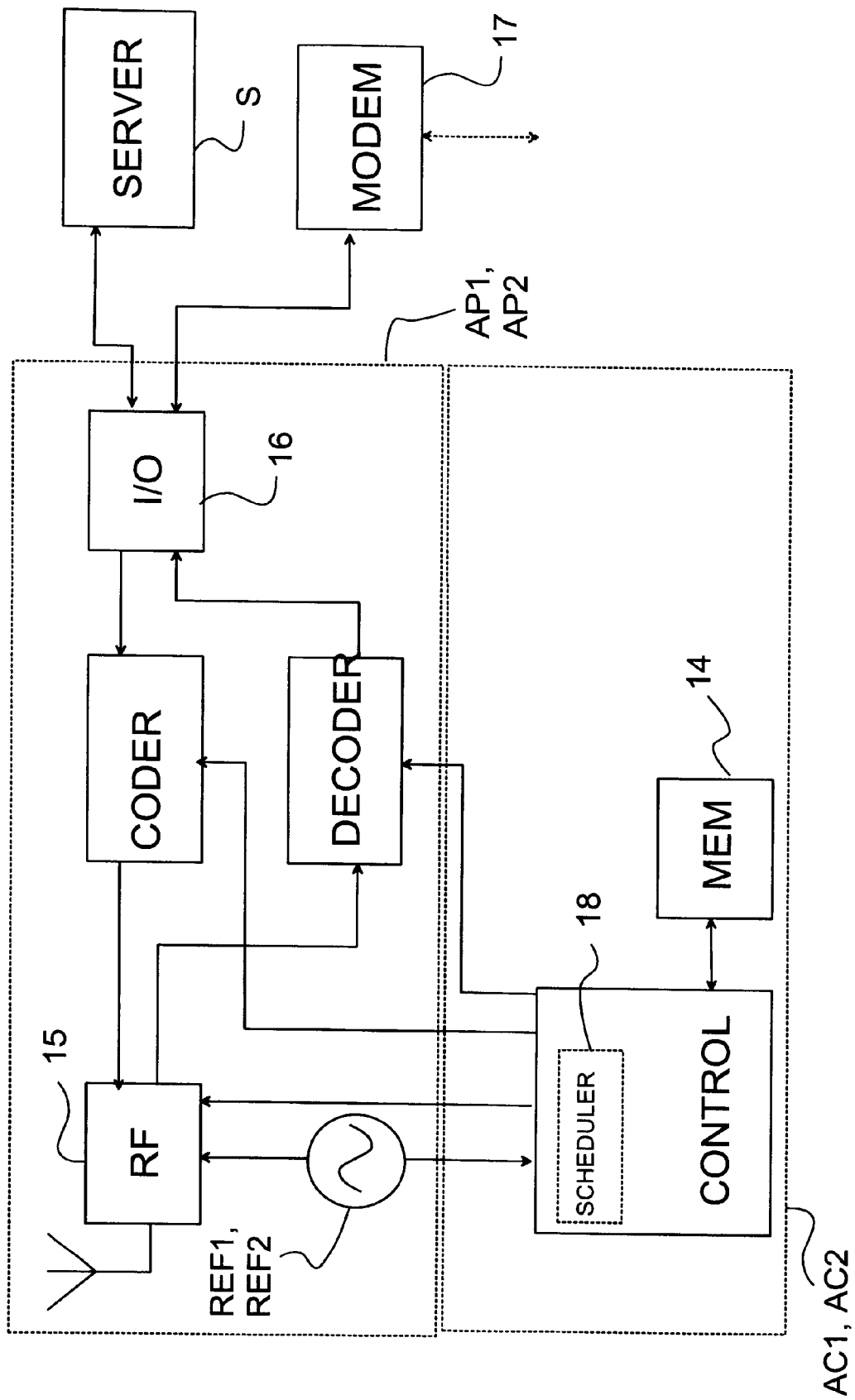
FIG. 3 is a reduced block diagram showing an access point according to a preferred embodiment of the invention.

Correspondingly, the access point AP1 (FIG. 3) has first communication means 15 for setting up a data transmission connection to wireless terminals MT1–MT4. The wireless local area network 1 according to the invention can be implemented as a local area network which is not connected to external data networks. Thus, one access point AP1 to which the wireless terminals MT1–MT4 of the local area network are connected, may be sufficient. In the wireless local area network, a data transmission connection 16 is advantageously arranged from one or more access points AP1, AP2 to a data processor S which is generally known as a server computer or, more briefly, a server. Such a server comprises company databases, application programs, etc., integrated therein in a way known as such. Thus, via the wireless terminal MT1, the users can initiate the applications installed in the server. The server S or the access point AP1 can also comprise second communication means 17 for setting up a data transmission connection to another data network such as the Internet data network or the UMTS mobile communication network.

For each access point and wireless terminal, an individual identifier is determined, wherein the access points are aware of the terminals connected to the access point at a given time. Correspondingly, the wireless terminals distinguish the frames transmitted by different access points from each other. These identifiers can be used also in such a situation in which the connection of the wireless terminal is transferred from one access point to another, for example due to a weakening in the quality of connection.

The wireless terminals MT1–MT4 connected to the local area network measure at intervals the strength of signals on that channel frequency on which the wireless terminal MT1–MT4 is connected to the access point AP1, AP2, as well as on adjacent channel frequencies. The signal strength is measured from the transmission of the BCCH control field by measuring a power level. From the measurement, the average value of the power is calculated and transmitted to the access point AP1, AP2 to which the wireless terminal is connected. If the wireless terminal MT1–MT4 detects the signal of another access point either on the same or on the adjacent channel frequency, the wireless terminal MT1–MT4 decodes the received signal and advantageously determines on the basis of the BCCH control field the timing of the data frames of this other access point with respect to the beginning of the data frame used in the connection. Moreover, the wireless terminal determines from the BCCH control field of this other data frame for instance the identifier and allocation strategy of the other access point, and the information is transmitted by the wireless terminal to that access point AP1, AP2 to which the wireless terminal MT1–MT4 is connected. Information on the allocation strategy used in the data frame is advantageously connected to a control field C of the data frame, such as the BCCH control field. In this access point AP1, AP2, information on another access point is stored e.g. in handover situations to select the channel and the allocation strategy.

The access points AP1, AP2 also conduct signal strength measurements on the channel frequency they are using and on the adjacent channel frequencies, and store the measurement results. If the access point AP1, AP2 detects the signal of another access point, the timing of the data frame FR1, FR2 as well as the identifier of the access point are determined in a corresponding way as in the wireless terminal MT1–MT4.

In the following, a situation will be described in which the user activates an application program in the wireless terminal MT1, the application program being stored in the server. In the description, the frame structures shown in FIGS. 4a and 4b will be used as examples of data frames FR1, FR2. The first data frame FR1 comprises control fields C1 such as RACH, BCCH and FCCH, and a data field D1 which contains time slots TS11–TS1n. Correspondingly, the second data frame FR2 contains control fields C2, such as RACH, BCCH and FCCH, and a data field D2 which contains time slots TS21–TS2n.

Before the application program can be activated, the wireless terminal MT1 has to be coupled to a data transmission connection with a local area network 1. This can be conducted advantageously in such a way that a network controller or a corresponding application program, which is provided with program codes for connecting to the local area network 1 and for transmitting information between the wireless terminal MT1 and the local area network 1, is activated in the wireless terminal MT1.

When activating the network controller, the necessary procedures are conducted for example to set the operational parameters of the radio part COM of the wireless terminal. Thus, the receiver of the radio part COM initiates the reception of signals on a channel frequency of the local area network. If the signal is not detected within a certain period of time, the channel frequency is changed. At that stage when a signal is detected on any channel frequency, the signal received by the receiver of the radio part COM is demodulated and transmitted to be decoded, wherein it is possible to determine the information transmitted in the radio signal, which is known as such. This decoded signal which is preferably stored in the receiving buffer in the memory 13 of the radio part, is searched for the identifier of the BCCH control field of the data frame FR1. The identifier of this BCCH control field is located at a particular point in the data frame, and therefore, after the identifier is found, the location of the BCCH control field in the receiving buffer is known. The BCCH control field contains for instance the identifier (AP ID) of the access point that has transmitted the frame FR1, the identifier of the local area network (NET ID), the allocation strategy information used by the access point AP1, and other information for the connection set-up, such as information on the transmission and reception time slots contained in the data frame FR1. The allocation strategy can be advantageously indicated by a single bit in the BCCH control field.

Figure 1B:
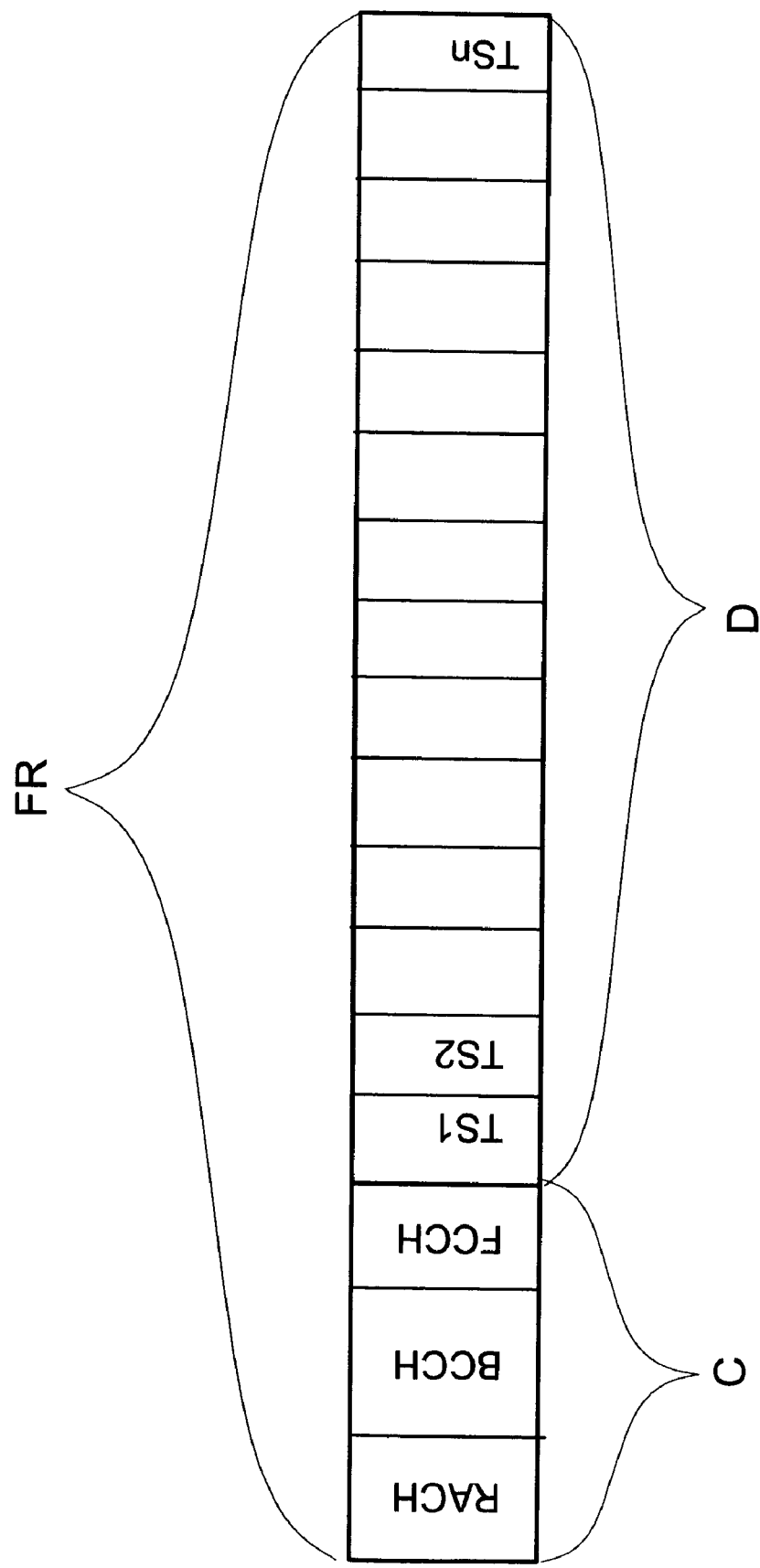
FIG. 1b shows a data frame in a HIPERLAN/2 system.

The wireless terminal MT1 is syncronized with the transmission of this access point AP1. The wireless terminal MT1 requests for a connection set-up by transmitting a RACH message to the access point AP1 at a moment of time allocated thereto. For example in the frame structure according to FIG. 1b, the RACH message can be transmitted after the transmission and reception time slots, before the next BCCH control field. In the message, the wireless terminal MT1 transmits information for instance on the quality of service desired for the connection and on the connection type, e.g. multimedia connection, data connection, speech connection. The type of the connection and the quality of service affect for instance the number of time slots TS11–TS1n to be allocated for the connection.

The access point controller AC1 examines the message and determines for instance from a resource allocation table or the like, the amount of free resources at the access point at that moment. If the amount of resources is sufficient for the connection set-up, the access point controller AC1 allocates the resources necessary for the connection. The memory means 14 of the access point controller AC1 are provided with transmission and reception queues (buffers) which are used for temporary storing of the received packets as well as for the temporary storing of packets waiting for transmission. Furthermore, each connection is provided with a connection identifier, wherein it is secured that the information is transmitted to the correct target. A priority may also be selected for the connection, wherein resources free at a given time, such as transmission and reception time slots, are issued in the order of priority. Depending for instance on the resource demand, it is possible to allocate a different number of time slots TS11–TS1n from the data field of the data frame FR1. The number of time slots allocated for the transmission and reception may vary within the same connection, as was mentioned earlier in this description. The number of time slots TS11–TS1n allocated for the connections may also vary according to the frame, wherein in each data frame FR1 the number of time slots TS11–TS1n may vary from zero to maximum.

Figure 5:
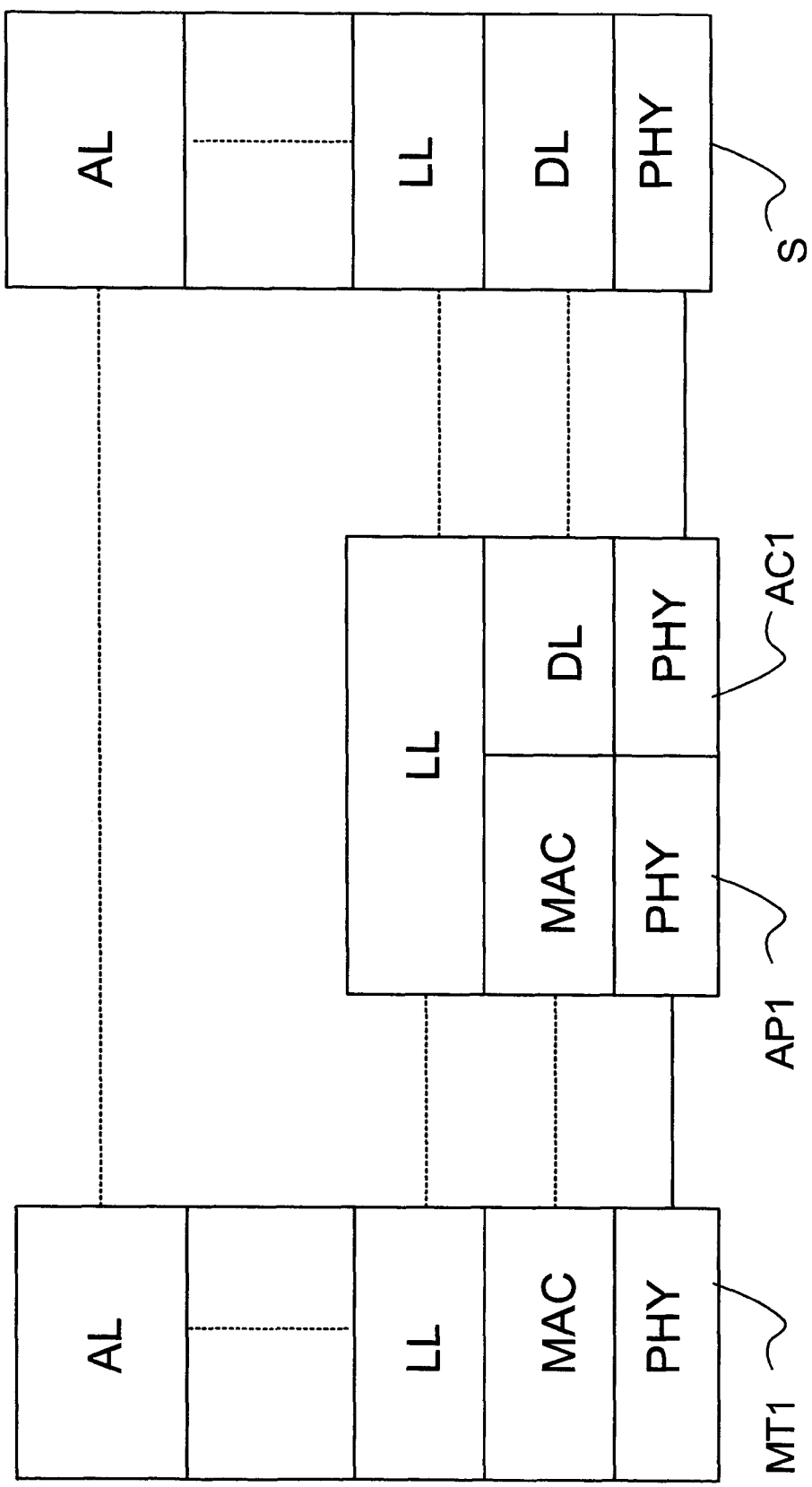
FIG. 5 shows the protocol stacks of the data transmission system according to a preferred embodiment of the invention in a reduced manner.

After the connection to the local area network 1 is set up, it is possible to start transferring information between the server S and the wireless terminal MT1 advantageously by means of a protocol, such as the IP (Internet Protocol). FIG. 5 illustrates this data transmission with the help of protocol stacks. The protocol stacks shown include an application layer AL, a network layer NL, a logical link layer LL and a physical layer PHY. In this preferred embodiment, on the radio channel, i.e. between the access point AP1 and the wireless terminal MT1, the logical link layer of the protocol stack comprises a lowermost MAC layer (Media Access Control) which takes care of using the radio channel in the communication between the wireless terminal MT1 and the access point AP1, e.g. of channel allocation in the transmission and reception of packets. This description concentrates primarily on the formation of the data frames FR1, FR2 of the MAC layer.

The access point controller AC1, AC2 is provided with a scheduler 18 which performs for instance the scheduling of the data frames FR1, FR2 of the access point AP1, AP2 and the allocation of the transmission and reception time slots for packets of active connections waiting for transmission. The scheduler sets the receiver of the access point to receive a radio signal for the duration of the period of time allocated in the RACH field of the frame. Thus, in addition to the above-presented connection set-up request, the wireless terminals MT1–MT4 can transmit different measurement data to the access point.

In the local area network according to the present preferred embodiment of the present invention, the field succeeding the RACH field in the data frame is the BCCH field, wherein the scheduler switches on the transmitter of the access point in order to transmit information set to be transmitted in the BCCH control field.

Figure 4A:
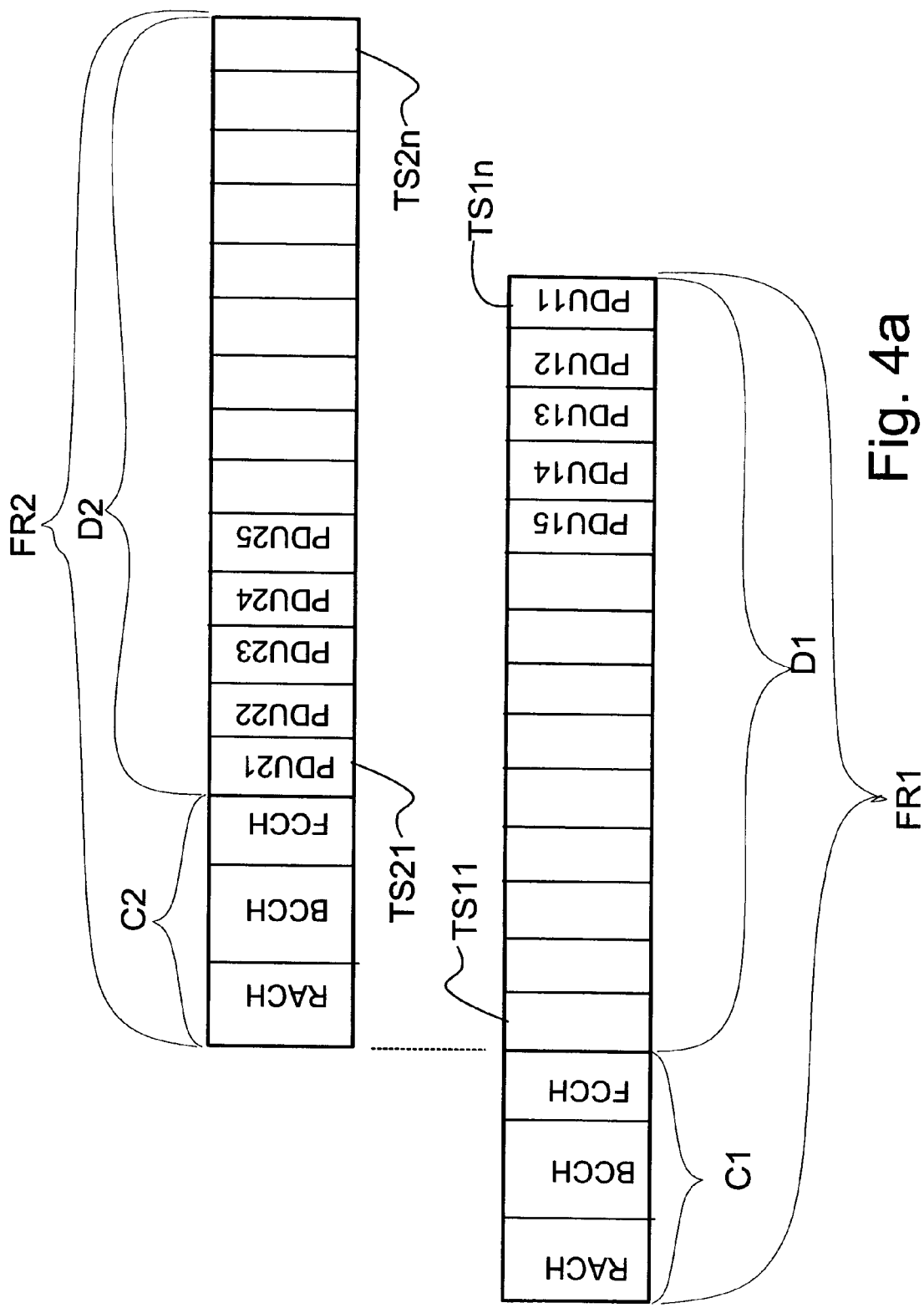
FIGS. 4a, 4b and 4c show the synchronization of the data frames of two access points.
Figure 4B:
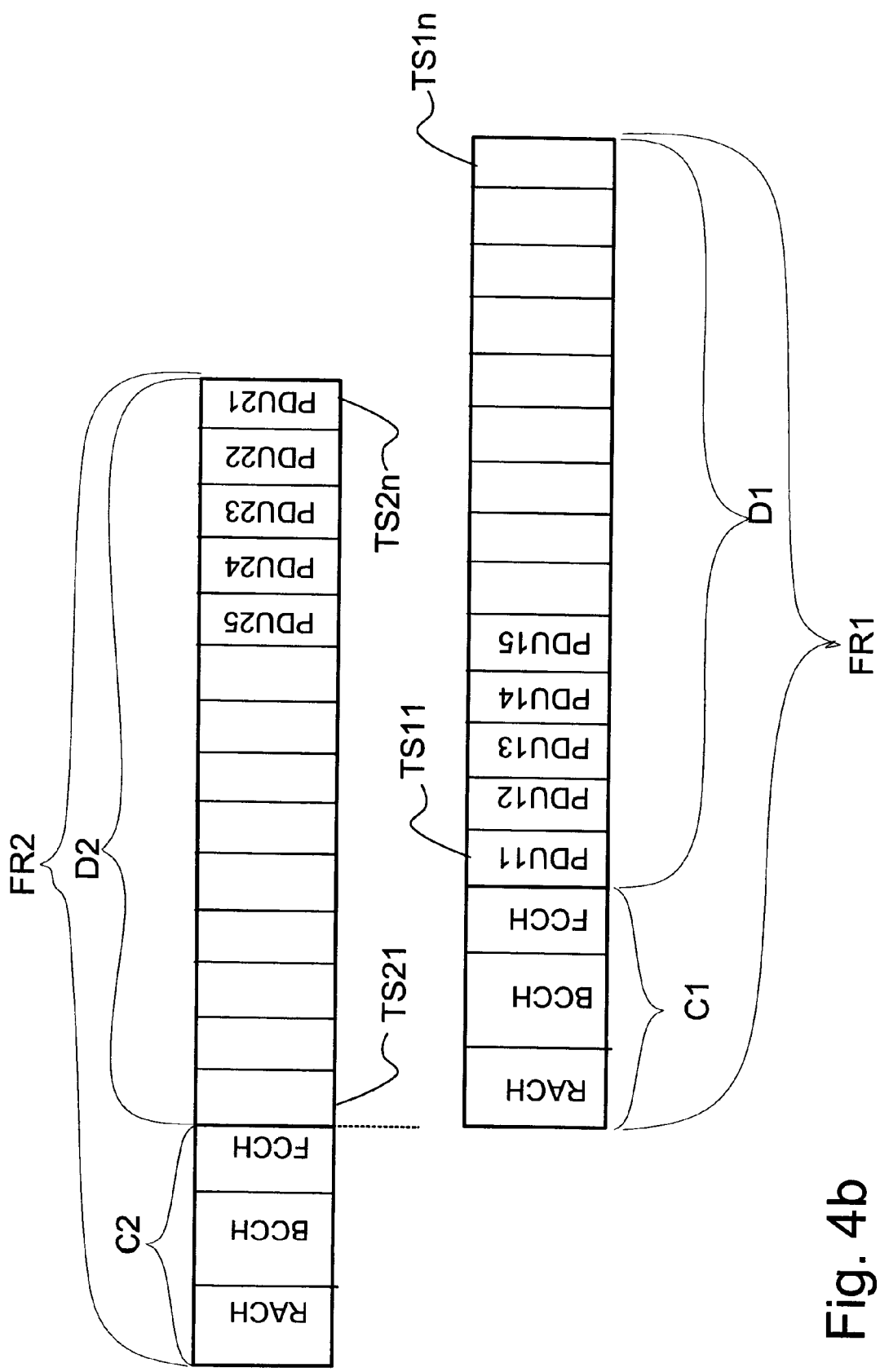

The scheduler also controls the filling-up of the time slots TS11–TS1n, TS21–TS2n in the data frame FR1, FR2 of the MAC layer with packet data units (PDU) of different connections, as an example of which FIGS. 4a and 4b show packet data units PDU11–PDU15 to be transmitted in the first data frame FR1 and packet data units PDU21–PDU25 to be transmitted in the second data frame FR2. The packet data units. PDU11–PDU15; PDU21–PDU25 of the same data frame FR1, FR2 can be packet data units of one or more connections. Furthermore, said connections can be connections of one or more wireless terminals. The manner in which the time slots TS11–TS1n are filled up depends on the allocation strategy selected by the access point AP1, AP2, which can advantageously be from the beginning to the end (Begin) or from the end to the beginning (End). For this purpose, it is possible to determine advantageously at least a first starting point TS11, TS21 and a second starting point TS1n, TS2n in the data field D1, D2. The first starting point TS11, TS21 is advantageously the beginning of the data frame and the second starting point TS1n, TS2n is advantageously the end of the data field. In the first allocation strategy alternative, i.e. from the beginning to the end, the scheduler starts to fill up the data field from the first starting point TS11, TS21 of the data field, preferably from the first time slot, wherein possible free time slots are located in the end of the data field D1, D2. Correspondingly, in the second allocation strategy alternative, i.e. from the end to the beginning, the scheduler starts filling up the data field from the second starting point TS1n, TS2n of the frame, preferably from the last time slot, wherein possible free time slots are located in the beginning of the data field D1, D2.

The selection of the allocation strategy the access point AP1, AP2 makes at a given time depends for instance on whether there are other access points using the same or adjacent channel frequency with the access point AP1, AP2 and on the signal strength of such access points in the wireless terminal MT1. In a situation where there are no interfering signals to be detected on the channel frequency used by the access point AP1, AP2 or on adjacent channel frequencies, the access point AP1, AP2 can select the allocation strategy freely.

Let us study the principles of selecting an allocation strategy with respect to the first access point AP1 by presuming that the first terminal MT1 is coupled (camped) to the first access point AP1 and that the signal of the second access point AP2 can be heard in the first terminal AP1. In such a situation where the interfering signal is either on the channel frequency used by the access point AP1 or on an adjacent channel frequency, the access point AP1 synchronizes its own transmission with the interfering signal and selects an allocation strategy best suitable for the situation. To perform the synchronization, the wireless terminal MT1 and/or the access point AP1 receive and decode the interfering signal to determine the timing of the data frame advantageously by retrieving the BCCH control field from the data frame, as was presented earlier in this description. The BCCH control field is also examined to find out which allocation strategy is used by this second access point AP2, wherein the access point AP1 being synchronized selects an opposite allocation strategy.

If the allocation strategy used by the second access point AP2 is Begin, the access point AP1 being synchronized selects the allocation strategy End. Thus, the synchronization is conducted in the method according to a preferred embodiment of the invention in the following way. The access point AP1 being synchronized schedules its own data frame FR1 in such a way that its control fields C1 are located before the control fields C2 of the second access point AP2, as shown in FIG. 4a. Since the length of the control fields is not necessarily constant, the access point AP1 being synchronized has to estimate in this situation the starting point of the control fields C2 in the data frame FR2 of the second access point AP2. Because the timing and length of the BCCH control field and the maximum length of the other control fields are known, the starting point can be deduced by subtracting the maximum length of the RACH control field from the starting time of the BCCH control field. The access point AP1 being synchronized is aware of the lengths of the control fields Cl of the data frame FR1 to be formed, and thus it is possible to determine the starting point of the data frame FR1 by subtracting the lengths of the BCCH and FCCH control fields from that deduced earlier, i.e. the supposed starting point of the data frame FR1 at the second access point. In the synchronization, possible inaccuracies, such as different propagation delays in the communication between different access points and wireless terminals are also taken into account by subtracting preferably also a guard time from the supposed starting point. Thereafter the time slots TS11–TS1n of the data field of the data frame FR1 are filled up from the end to the beginning in accordance with the resources allocated for the connections. Thus the advantage is achieved that possible free time slots in this data frame FR1 of the access point AP1 being synchronized, are located in the beginning of the data field D1, and the control fields C2 of the second access point are transmitted simultaneously with them. Correspondingly, the end of the data frame FR2 of the second access point AP2 possibly contains free time slots TS21–TS2n, wherein the second access point AP2 and the wireless terminals MT3, MT4 connected to it do not transmit on this channel frequency. This reduces the amount of interference especially in such situations where all time slots TS11–TS1n, TS21–TS2n are not in use. Also in such a situation where e.g. in the first access point AP1 all the resources of the channel are in use, but some of the resources of the channel used by the second access point AP2 are free, it is possible to use the method according to the invention to reduce interference in the transmission of the second access point to the transmission of the control fields C1 of the first access point AP1.

If the allocation strategy used by the second access point AP2 is End, the access point being synchronized selects the allocation strategy Begin. Thus, the synchronization is executed in the method according to a preferred embodiment of the invention in the following way. The access point AP1 being synchronized schedules its own data frame FR1 in such a way that its control fields are located after the control fields of the second access point AP2, as shown in FIG. 4b. Since the length of every control field is not necessarily constant, the access point AP1 being synchronized has to estimate in this situation the ending point of the control fields C2 in the data frame FR2 of the second access point AP2. Because the timing and length of the BCCH control field and the maximum length of other control fields are known, the ending point can be deduced by adding the maximum length of the RACH control field into the starting time of the BCCH control fields. Also here, a guard time is preferably added into the supposed ending point. Thereafter the time slots TS11–TS1$n$ of the data frame FR1 are filled up from the beginning to the end according to the resources allocated for the active connections. In this situation the possible free time slots in this data frame FR1 of the access point AP1 being synchronized are located in the end of the data fields with which the control fields C2 of the second access point are transmitted simultaneously. Correspondingly, in the beginning of the data frame FR2 of the second access point AP2, there are possibly free time slots, wherein the second access point AP2 and the wireless terminals MT3, MT4 connected thereto do not transmit on this channel frequency.

Figure 4C:
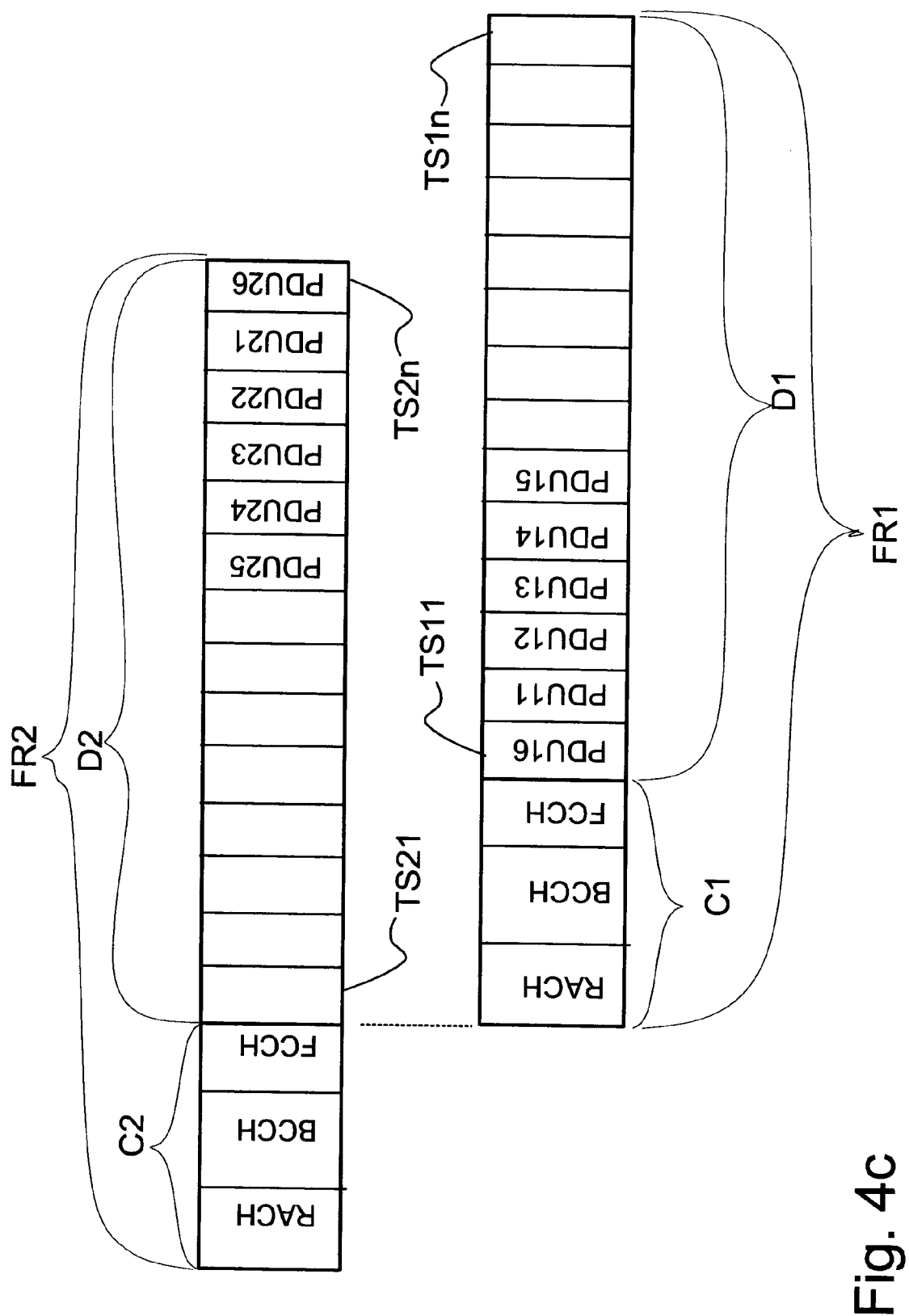

In a situation where only a few wireless terminals receive the signals of two or more access points, the connections of such terminals are more likely to be interfered than the connections of such terminals that detect only the signal of that access point to which they are connected. Thus, in the synchronization method according to a preferred embodiment of the invention, the schedulers of the access point controllers AC1, AC2 aim at allocating for transmission time slots from the access point to the terminal MT1–MT4 those time slots in the data frame FR1, FR2 in which the probability of interference is as small as possible. This situation is illustrated in the appended FIG. 4c. It is presumed therein that the first terminal MT1 communicates with the first access point AP1 and the second terminal MT2 with the second access point AP2. Furthermore, the first terminal MT1 has also detected the data frames FR2 of the second access point AP2 and transmitted e.g. the timing data and the allocation strategy, in this example the End allocation strategy, to the controller AC1 of the first access point.

Correspondingly, the second terminal MT2 has also detected the data frames FR1 of the first access point AP1 and transmitted e.g. the timing data to the controller AC2 of the second access point. Thus, the scheduler of the controller AC1 of the first access point has selected the Begin allocation strategy and synchronized its own data frames FR1 with the data frames FR2 of the second access point AP2. In order to minimize interference, the scheduler of the controller AC1 of the first access point has allocated from the beginning of the data field in the data frame FR1 of the first access point AP1 one (or more, if necessary) time slot TS11–TS1$n$ as a transmission time slot, in which the access point AP1 transmits information PDU16 (packets of an active connection) to the wireless terminal MT1. Correspondingly, the scheduler of the controller AC2 of the second access point has allocated from the end of the data field in the data frame FR2 of the second access point AP2, one (or more, if neccessary) time slot TS2$n$ as a transmission time slot in which the access point AP2 transmits information PDU26 to the wireless terminal MT2.

The above-presented principles can also be applied in a situation in which an access point AP1–AP4 tries to change the channel it has used in a connection. Since the Wireless terminals coupled to the access point have conducted signal strength measurements also on the adjacent channel frequencies and transmitted the measurement data to the access point, the access point is aware of the possible free channel frequencies. Thus, the access point can select one of the free frequencies. The access point can also select such a channel on which data frames of only one other access point have been detected, wherein the allocation strategy selected is other than the allocation strategy used by this access point. If, however, the access point selects such a channel on which data frames of more than one access point have been detected, the allocation strategy should be selected preferably on the basis of the allocation strategy of such an access point in which the greatest signal strength has been measured.

The synchronization may also be necessary at other times than when changing the channel. The reason for this is that interference circumstances may change and that the frequencies of the reference oscillators REF1, REF2 at the access points are not exactly the same in practical applications. For example in the Hiperlan/2 local area network definitions, the required accuracy of the reference oscillator is ±20 ppm (parts per million). Thus the difference between the reference oscillators REF1, REF2 of two access points can be as substantial as double the greatest inaccuracy, in other words in this example 40 ppm. Thus, the synchronization should be conducted typically at intervals of a few seconds in order to keep the access points AP1, AP2 as well synchronized as possible. Because the frequencies of the reference oscillators REF1, REF2 do not usually change very rapidly, it is possible to correct the frequency differences in the access points without frequent measurements.

In practice, the rapid change in the frequency of the reference oscillator REF1, REF2 can be primarily due to a rapid change in the temperature. Since the access points are typically placed indoors, the variations in temperature are small. In the method according to a preferred embodiment of the invention, the differences in the frequencies of the reference oscillators REF1, REF2 are compensated in the following way. When the access point AP1 synchronizes with the data frames FR2 of the second access point AP2, the timing difference of data frames FR1, FR2 of the first access point AP1 and the second access point AP2, i.e. the timing difference of the BCCH control fields is measured in the access point AP1 being synchronized. Somewhat later a new measurement is executed, wherein the change in the timing difference as well as the rate of change can be detected, because the time between measurements is also known. The rate of change is proportional to the frequency difference between the reference oscillator REF1 of the first access point and the reference oscillator REF2 of the second access point, wherein the rate of change can be utilized to correct the synchronization by changing the timing of the data frame FR1 correspondingly. In small frequency differences the correction can be executed less frequently than in large frequency differences. Because the frequency difference is not necessarily constant, but can change for example when the temperature changes, the above-described measurement is executed at intervals, wherein new measurement results will be used to correct the synchronization. In this method, it is thus not necessary to know the real difference of the frequencies of the reference oscillators REF1, REF2 of the access points.

When the connection between the wireless terminal MT1 and the first access point AP1 is interfered by the second access point AP2, the wireless terminal MT1 measures the timing of the data frame FR2 of this interfering access point AP2 and transmits information thereof to the first access point AP1. The wireless terminal MT1 also determines the frequency difference between the reference oscillators REF1, REF2 of the access points AP1, AP2. The wireless terminal MT1 is synchronized with the data frames FR1 of the first access point AP1, wherein the wireless terminal MT1 can measure the change in the timing of the data frames FR2 of the second access point AP2 with respect to the data frames FR1 of the first access point AP1. The wireless terminal MT1 transmits the information on the change in this timing to the access point AP1, which, on the basis of this information, can change its own timing. The wireless terminal MT1 can measure the deviations in the timings for example under the control of the first access point AP1.

It is obvious that the present invention is not restricted solely to the embodiments presented above, but it can be modified within the scope of the appended claims.

What is claimed is:

1. A method in a wireless data transmission system (1) which comprises wireless terminals (MT1–MT4), at least a first access point (AP1) and a first access point controller (AC1), and a second access point (AP2) and a second access point controller (AC2), in which method first data frames (FR1) and second data frames (FR2) are established, the controller (AC1) of the first access point controls the transmission and reception of the first data frames (FR1) between the first access point (AP1) and the wireless terminals (MT1, MT2) communicating with the first access point, wherein said first data frames (FR1) are used in the data transmission between the first access point (AP1) and the wireless terminals (MT1, MT2) communicating with the first access point, the controller (AC2) of the second access point controls the transmission and reception of the second data frames (FR2) between the second access point (AP2) and the wireless terminals (MT3, MT4) communicating with the second access point, wherein said second data frames (FR2) are used in the data transmission between the second access point (AP2) and the wireless terminals (MT3, MT4) communicating with the second access point, the first (FR1) and the second data frames (FR2) comprise at least one control field (C1, C2) and data field (D1, D2), from said data field (D1, D2) time slots (TS11–TS1n, TS21–TS2n) are allocated for the communication of data transmission connections, and in which wireless data transmission system (1) one or more channel frequencies are used in the transmission and reception of the data frames (FR1, FR2), wherein each data transmission connection is allocated one of said channel frequencies, characterized in that also in the method a first starting point (TS11, TS21) and a second starting point (TS1n, TS2n) are determined from said data field (D1, D2), a first allocation strategy is determined, in which the allocation of the time slots (TS11–TS1n, TS21–TS2n) of the data field (D1, D2) is started from said first starting point (TS11, TS21) of the data field, and a second allocation strategy is determined, in which the allocation of the time slots (TS11–TS1n, TS21–TS2n) of the data field (D1, D2) is started from said second starting point (TS11, TS21) of the data field, and information on the allocation strategy used in the data frame (FR1, FR2) is attached to the data frame (FR1, FR2), and the transmission and reception of the first data frames (FR1) is synchronized with the transmission and reception of the second data frames (FR2), wherein at the first access point (AP1), the allocation strategy of the second data frames (FR2) is examined, and that allocation strategy which is not used in the second data frames (FR2) is selected for the first data frames (FR1).

2. The method according to claim 1, characterized in that the beginning of the data field (D1, D2) is selected as said first starting point (TS11, TS21) and the end of the data field (D1, D2) is selected as said second starting point (TS1n, TS2n).

3. The method according to claim 1, characterized in that to synchronize the first data frames (FR1):

said at least one control field (Cl) of the first data frame (FR1) is scheduled before said at least one control field (C2) of the second data frames (FR2), if the allocation strategy selected for the second data frames is the first allocation strategy, or said at least one control field (Cl) of the first data frame (FR1) is scheduled after said at least one control field (C2) of the second data frames (FR2), if the allocation strategy selected for the second data frames is the second allocation strategy.

4. The method according to claim 1, characterized in that the wireless terminal (MT1, MT2) communicating with the first access point (AP1) also receives data frames (FR2) transmitted on the channels adjacent to the channel frequency used in the data transmission connection, the timing difference between the control field (C2) of at least one data frame received on said adjacent channels and the control field (C1) of the data frame in a data transmission connection of said wireless terminal (MT1, MT2) is determined, information on said timing difference is transmitted to said first access point (AP1), and the information on said timing difference is stored in the controller (AC1) of said first access point.

5. The method according to claim 4, characterized in that in the wireless terminal (MT1, MT2) communicating with the first access point (AP1), the strength of the radio signals is also measured on channels adjacent to the channel frequency used in the data transmission connection, and information on the strength of the signals is transmitted to said first access point (AP1).

6. The method according to claim 4, characterized in that a guard time is determined, wherein the synchronization of the data frames (FR1, FR2) is conducted on the basis of said timing difference and said guard time.

7. The method according to claim 4, characterized in that in the first access point (AP1), the channel frequency of at least one data transmission connection is changed, wherein to select a new channel frequency on the basis of the measurement data stored in the controller (AC1) of the first access point:

it is determined on which channel frequencies data frames (FR2) of other access points (AP2) have not been detected, wherein one for such channel frequencies is selected as the new channel frequency of said data transmission connection, and the allocation strategy can be selected irrespective of the other access points (AP2), or if data frames (FR2) of at least one other access point (AP2) have been detected on each channel frequency used in said wireless data transmission system (1), it is determined on which channel frequencies the data frames (FR2) of at least one other access point (AP2) have been detected, wherein one of such channel frequencies is selected in the controller (AC1) of the first access point as a new channel frequency for said data transmission connection, it is examined which allocation strategy is selected for the data frames (FR2) of said other access point (AP2), and that allocation strategy is selected which is not used in the data frames (FR2) of said other access point (AP2).

8. The method according to claim 1, characterized in that the first access point (AP1) also receives the data frames (FR2) transmitted on the channels adjacent to the channel frequency used in the data transmission connection, the timing difference between the control field (C2) of at least one data frame received on said adjacent channels and the control field (Cl) of the data frame in a data transmission connection of said access point (AP1) itself is determined, the information on said timing difference is stored in the controller (AC1) of said first access point.

9. The method according to claim 8, characterized in that in the first access point (AP1), the strength of the radio signals is also measured on the channels adjacent to the channel frequency used in the data transmission connection, and information on the signal strengths is transmitted to the controller (AC1) of said first access point.

10. The method according to claim 1, characterized in that the following stages are also executed in the first access point (AP1):

a) measuring a first timing difference between the data frames (FR1, FR2) of said first access point (AP1) and of said second access point (AP2), b) measuring a second timing difference between the data frames (FR1, FR2) of said first access point (AP1) and of said second access point (AP2), c) measuring the time passed between said first measurement and said second measurement, d) changing at intervals the synchronization on the basis of said first and second timing difference and the time passed between the measurements, wherein stages b) and c) are executed less frequently than stage d).

11. A wireless communication system (1) comprising wireless terminals (MT1–MT4), means (AC1, AC2) for forming first data frames (FR1) and second data frames (FR2), at least a first access point (AP1) and a first access point controller (AC1), and a second access point (AP2) and a second access point controller (AC2), means (AC1) for controlling the transmission and reception of first data frames (FR1) between the first access point (AP1) and the wireless terminals (MT1, MT2) communicating with the first access point, wherein said first data frames (FR1) are arranged to be used in the data transmission between the first access point (AP1) and the wireless terminals (MT1, MT2) communicating with the first access point, means (AC2) for controlling the transmission and reception of the second data frames (FR2) between the second access point (AP2) and the wireless terminals (MT3, MT4) communicating with the second access point, wherein said second data frames (FR2) are arranged to be used in the data transmission between the second access point (AP2) and the wireless terminals (MT3, MT4) communicating with the second access point, means for transmitting said data frames (FR1, FR2) between the wireless terminals (MT1–MT4) and the access points (AP1, AP2) on one or more channel frequencies of the wireless communication system (1), and at least one control field (C1, C2) and data field (D1, D2) arranged in the first (FR1) and second data frames (FR2), wherein the wireless data transmission system (1) comprises means (AC1, AC2) for allocating time slots (TS11–TS1n, TS21–TS2n) from said data field (D1, D2) for the data transmission of data transmission connections, characterized in that in the wireless data transmission system (1)

a first starting point (TS11, TS1n) and a second starting point (TS21, TS2n) are determined from said data field (D1, D2) of the data frame, and a first allocation strategy is determined, wherein the allocation of the time slots (TS11–TS1n, TS21–TS2n) is arranged to be started from said first starting point (TS11, TS21) of the data field, and a second allocation strategy is determined, wherein the allocation of the time slots in the data field is arranged to be started from said second starting point (TS1n, TS2n) of the data field, and that the wireless data transmission system (1) also comprises:

means for transmitting the allocation strategy used in the data frame (FR1, FR2) in the data frame, synchronizing means for synchronizing the transmission and reception of the first data frames (FR1) with the transmission and reception of the second data frames (FR2), means for examining the allocation strategy of the second data frames (FR2), and means for selecting an allocation strategy for the first data frames (FR1) on the basis of the allocation strategy of the second data frames (FR2).

12. The wireless data transmission system (1) according to claim 11, characterized in that the said first starting point (TS11, TS21) determined is the beginning of the data field (D1, D2) and the said second starting point (TS1n, TS2n) determined is the end of the data field (D1, D2).

13. The wireless data transmission system (1) according to claim 11, characterized in that the synchronizing means comprise:

scheduling said at least one control field (C1) of the first data frame (FR1) before said at least one control field (C2) of the second data frames (FR2) if the allocation strategy selected for the second data frames is the first allocation strategy, or scheduling said at least one control field (C1) of the first data frame (FR1) after said at least one control field (C2) of the second data frames (FR2) if the allocation strategy selected for the second data frames is the second allocation strategy.

14. The wireless data transmission system (1) according to claim 11, characterized in that the wireless terminal (MT1, MT2) communicating with the first access point (AP1) comprises means for receiving the data frames (FR2) transmitted on the channels adjacent to the channel frequency used in the data transmission connection, means for determining the timing difference between the control field (C2) of at least one data frame received on said adjacent channels and the control field (C1) of the data transmission connection of said wireless terminal (MT1, MT2) itself, means for transmitting the information on said timing difference to said first access point (AP1) and means for storing said timing difference to the controller (AC1) of said first access point.

15. The wireless data transmission system (1) according to claim 11, characterized in that the wireless terminal (MT1, MT2) comprises measuring means for measuring the strength of radio signals on channels adjacent to the channel frequency used in the data transmission connection, and means for transmitting the information on the signal strengths to said first access point (AP1).

16. The wireless data transmission system according to claim 11, characterized in that it is a wireless local area network.

* * * * *